April 7, 1970   P. T. GILBERT, JR   3,504,976
PROCESS AND APPARATUS FOR THE DETECTION OF HALOGENS
Filed May 4, 1966
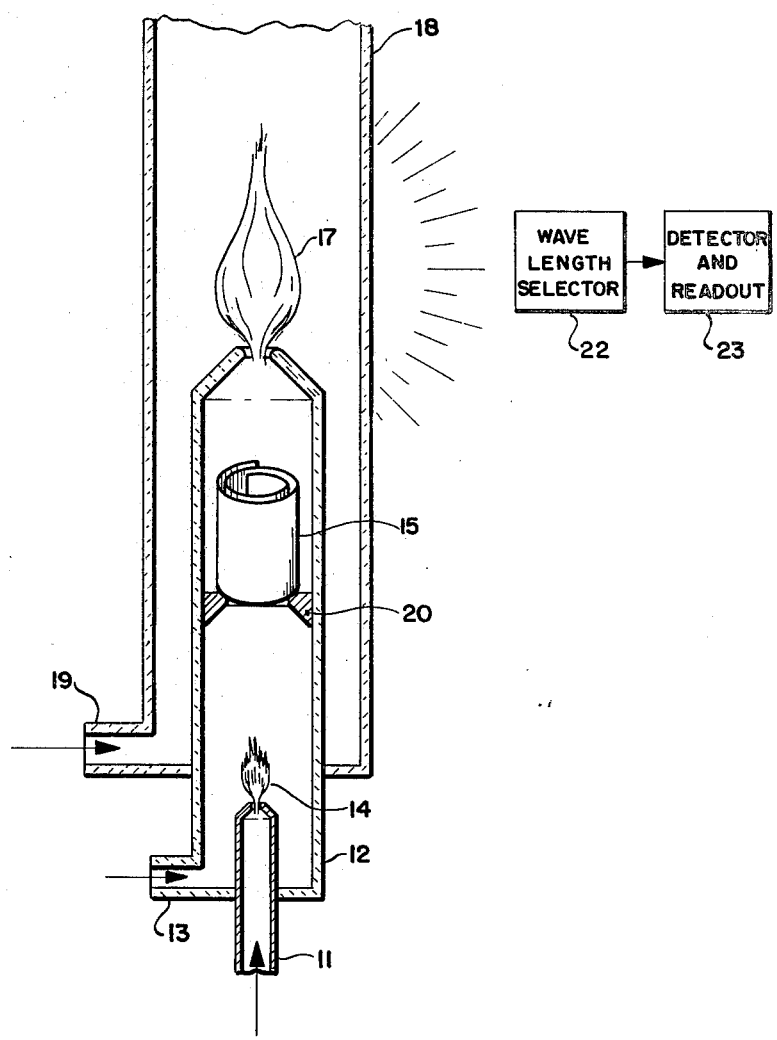
INVENTOR.
PAUL T. GILBERT, Jr.
BY
ATTORNEY United States Patent Office 3,504,976
Patented Apr. 7, 1970

3,504,976
PROCESS AND APPARATUS FOR THE DETECTION OF HALOGENS
Paul T. Gilbert, Jr., Los Altos, Calif., assignor to Beckman Instruments Inc., a corporation of California
Filed May 4, 1966, Ser. No. 547,656
Int. Cl. G01j 3/30
U.S. Cl. 356—87                    5 Claims

ABSTRACT OF THE DISCLOSURE

A process and apparatus is disclosed affording an inexpensive and reliable means for the continuous monitoring of a test sample for the presence of a halogen or halogen compound. The sample, in vapor or gas form, is passed over a heated indium surface where the sample reacts with the indium to form a volatile indium halide. These indium halides are burned in a flame which imparts such energy to the indium halide as to cause them to photometrically radiate. Such radiation is spectrally unique to indium halides offering a distinctive means of detection both quantitatively and qualitatively with ability to discriminate against interfering compounds heretofore not possible.

---

This invention relates generally to the detection of halogens and halogen containing compounds and more particularly to new and novel process and apparatus for the detection of halogens in any form which may be made specific to a particular halogen.

Various methods have been utilized for the determination of halogen and halogen compounds in air, e.g., flame emission, electron capture, electrochemical detection and the liberation of ions from hot surfaces. One prior art method is the Beilstein test which provided a qualitative determination of volatile halogen compounds by a flame photometric method in which a flame, burning in contact with metallic copper, is colored green in the presence of chlorine, bromine, iodine and certain other substances. A second method and apparatus for producing the characteristically colored Beilstein flame consists of mixing the test gas (the gas to be tested for the presence of the halogen or halogen containing compound) with a fuel gas, passing the mixture over heated copper and subsequently igniting the gases. In this system the copper was not in direct contact with the flame but was indirectly heated by preheating the gas mixture. This preheating was accomplished by either heating the conduit through which the gas mixture passed or by burning the gas mixture in an atmosphere lean in combustion support gases such that not all of the fuel gases are consumed. In the latter system the hot gases from the first flame are passed over the copper and subsequently burned in a second flame which constitutes the Beilstein flame. This second method has the advantage over the standard Beilstein test in that it provides a degree of quantitative precision.

All of these methods suffer from one or more disadvantage, such as insufficient sensitivity, limited concentration range, non-linearity, instability of the zero reading, poor precision or reproducibility, slow response, dependence of response on the nature of the halogen compound, the inability to continuously monitor, or the complexity of the equipment.

The original Beilstein test in which the copper is brought into direct contact with the flame affords a degree of specificity to chlorine, bromine and iodine but has a very low sensitivity. The second method mentioned above where dual flames are utilized although having a much higher sensitivity affords no specificity.

The single figure of the drawing illustrates a novel apparatus for detecting the presence of a halogen or halogen containing compound in any form which may be made specific to a particular halogen.

Referring now to the drawing, there is illustrated a first flame supporting structure comprising tube 11 adapted to be connected to a source of fuel gas such, for example, as hydrogen. A second flame supporting structure comprising tube 12 encloses the tip of tube 11 and has an inlet 13 adapted to be connected to a source of flame supporting gas such as air. The sample to be tested for the present of a halogen or halogen compound may be entrained into the flame 14 by any suitable means such as by adding the sample to either the fuel gas or the support gas. Alternatively, the sample may be brought alongside the flame by a jet, not shown, and entrained into the burning flame. In some instances, it is merely desired to test for the presence of the halogens in air. In this instance, no sample atomizer is necessary and the burning of hydrogen in the presence of air is sufficient. Liquids may be atomized into the fuel or support gas in any suitable manner well known in the art and solids may be provided by the method described by Gilbert, "Direct Flame Photometric Analysis of Powdered Materials," Analytical Chemistry 34, 1025 (1962).

Located within the upper portion of tube 12 is an indium insert 15 over which the hot gases from flame 14 pass. The quantity of combustion supporting gas admitted to tube 12 is insufficient to allow complete combustion of the fuel gases in flame 14. The remaining fuel gases are burnt in a second flame 17 as they escape from tube 12. If desired, the tube 12 may be surrounded by a chimney 18 having an air or other flame supporting gas inlet 19.

The metallic indium insert 15 may be provided in any number of forms other than the loosely coiled spiral illustrated in the drawing. The insert may be formed as a screen or as a tube. Since the operating temperatures are believed to be above the melting temperature of indium a coating of indium on any suitable substrate is most suitable. Beryllium copper forms one such suitable substrate. The indium insert may be supported in any suitable manner such as by shelf 20. In one test, an indium coated copper tube was suspended within tube 12 by a palladium wire.

The first flame supporting tube 11 may be of any suitable material. It is generally preferred, however, that tube 12, supporting the second flame, be of non-metallic construction and may be composed of Vycor or Pyrex. The chimney 18 is preferably of Pyrex to allow radiant energy to pass therethrough. It is obvious however that chimney 18 may be omitted.

Where a halogen or halogen compound is present, the intensity of the indium line at 4511 A. is greatly increased over the background signal in the absence of the halogen or halogen compound. The stability of the device is good and the instrument will respond well to concentrations as high as 4500 μg./l. (micrograms of a halogen per liter of support gas). The background reading in the absence of a halogen is equivalent to approximately 10 μg./l. The following characteristics of indium are those which are believed to render it more useful in a halogen detector. Only (3), (4) and (7) are equally true when copper is utilized.

(1) Indium has a low resonance potential such that its resonance lines are readily excited in a flame;

(2) The resonance lines, and particularly that at 4511 A., have high transition probabilities and are inherently intense;

(3) Indium readily reacts with the hydrogen halides formed in the lower flame;

(4) The halides are readily volatile;

(5) Indium is largely dissociated to atomic vapor in an ordinary flame such as air-hydrogen so that its atoms will be available to radiate;

(6) The strongest radiation being concentrated in a sharp line, there is less likelihood of spectral interference than in the case of the broad-band emissions of copper;

(7) The solid oxide of indium is reduced by hydrogen so that the metallic surface will not become inaccessible through oxidation;

(8) The vapor pressure of indium is quite low;

(9) Indium is molten at the temperatures of use circulating on the surface and thus presenting a clean indium surface;

(10) Indium wets most surfaces and is easily applied and supported.

Although (8) is a disadvantage, this characteristic does not render the system undesirable and the other advantages outweigh this disadvantage.

In addition to the foregoing advantages, it has been discovered that the emission spectra of the indium halides is present when a halogen or halogen compound is present in the test gas. In the dual burner method previously discussed the copper halide spectra is not present, or at least is not detectable. Since the indium halide spectra consist of sharp, narrow bands with relatively little emission between the bands the system may be made specific to a particular halogen. For example, the indium monochloride InCl emission band at 3600 A., which lies in the near ultraviolet region, is emitted with high intensity when a chlorine compound is present.

Referring again to the drawing, radiant energy emitted from flame 17 passes any suitable wavelength selector 22 to a detector connected to readout 23. Wavelength selection may be performed by any suitable means such as filters or a monochromator. The wavelength selector may be set or selected to pass any line or wavelength characteristic of the particular indium halide if the system is to be made selective to a particular halogen or may be made sensitive to the indium line at 4511 A. if the presence of any halogen is to be detected.

The utilization of indium in the burner and the detection of the halogen halide bands gives the instant invention marked advantages over the prior art dual flame halogen detectors in that:

(1) it shows increased sensitivity;

(2) it can be made specific to any one of the halides;

(3) the background is extremely low since, although the indium continues to vaporize in the absence of a halogen compound, no indium halide is formed unless the halogen is present and the intrinsic hydrogen flame background is very weak; and (4) at the wavelengths useful for the indium halides, light leakage from room light results in very little interference.

The method and apparatus disclosed affords an inexpensive, reliable means for the continuous monitoring of a test sample for the presence of a halogen or halogen compound. The system may be made sensitive to the halogens as a class or may made specific to a particular halogen by the selection of an appropriate wavelength. Although the burner has been illustrated and described as the dual flame type, the heating of the indium may be accomplished by indirectly heating the fuel and support gases by heating the conduit as is known in the art. Further, the indium insert may be indirectly heated by any suitable means, e.g., electrically. In these instances, the flame 14 and its supporting structure may be omitted.

Many other variations and embodiments of the present invention are possible in light of the foregoing teachings and the embodiments illustrated are given by way of example only. It is therefore to be understood that the invention may be practiced within the scope of the claims otherwise than as specifically described.

What is claimed is:

1. A burner for use in the determination of halogen compounds in a gas mixture comprising:
   a flame supporting structure having a tip for supporting a flame;
   an indium insert contained in said structure and spaced from said tip such that said insert is not contacted by a supported flame;
   means for supplying a fuel gas to said tip;
   means for introducing a sample and mixing said sample with said fuel gas to form a gas mixture that passes over said insert; and
   means for heating said mixture prior to passage over said insert.

2. An apparatus for detecting the presence of a specific halogen in a sample comprising:
   a flame supporting means;
   an indium insert in said flame supporting means;
   means for passing hot gases including a fuel gas and a sample gas over said indium insert and supplying said gases to said flame supporting means; and
   means for selecting a wavelength in the emission spectrum of the indium halide of a specific halogen compound.

3. A burner for use in the selective determination of halogen compounds in a gas mixture comprising:
   a first flame supporting structure;
   means for supplying a fuel gas to said flame supporting structure;
   means for supplying limited quantities of a flame supporting gas to a flame supported on said structure such that incomplete combustion of said fuel gas occurs;
   means for entraining a sample in said first flame;
   a second flame supporting structure;
   an indium insert in said second flame supporting structure and spaced from the base of a flame supported by said second structure;
   means for passing the hot gases from said first flame supporting structure over said indium to said second structure whereby the remaining fuel gases may be supplied to and support a second flame.

4. The process of detecting the presence of a halogen or halogen containing compound in a sample comprising the steps of:
   entraining a sample in a gas including at least a fuel gas to form a mixture, passing the mixture over heated indium, igniting the mixture to form a flame and measuring radiation emitted at a wavelength characteristic of a halide of indium corresponding to the halogen to be detected.

5. The process of detecting the presence of a particular halogen or halogen containing compound in a sample comprising the steps of:
   burning a first flame in a fuel rich atmosphere while entraining a sample into said flame thereby forming exhaust gases, passing the exhaust gases over indium, igniting the exhaust gases in a second flame and measuring radiation emitted at a wavelength characteristic of a halide of indium corresponding to the halogen to be detected.

References Cited

UNITED STATES PATENTS

| | | | |
|---|---|---|---|
| 2,200,523 | 5/1940 | Tuel | 23—254 |
| 2,589,116 | 3/1952 | Nolcken | 23—254 |
| 2,779,666 | 1/1957 | Anthes | 23—232 |
| 3,025,141 | 3/1962 | Van der Smissen | 23—254 X |
| 3,213,747 | 10/1965 | Van der Smissen. | |

OTHER REFERENCES

Little: A Text-Book of Inorganic Chemistry, vol. 4, London, Charles Griffin & Company, Limited, 1917, pp. 150–152.

RONALD L. WIBERT, Primary Examiner

F. L. EVANS, Assistant Examiner

U.S. Cl. X.R.

431—126; 23—232, 254